Parson & Houston.
Horse Rake.
N° 21358   Patented Aug. 31, 1858.

UNITED STATES PATENT OFFICE.

L. H. PARSON AND GEO. HOUSTON, OF MIDDLETOWN, NEW YORK.

IMPROVEMENT IN HORSE-RAKES.

Specification forming part of Letters Patent No. 21,358, dated August 31, 1858.

*To all whom it may concern:*

Be it known that we, L. H. PARSON and GEORGE HOUSTON, both of Middletown, in the county of Orange and State of New York, have invented a new and Improved Horse-Rake; and we do hereby declare that the following is a full, clear, and exact description of the same, reference being had to the annexed drawings, making a part of this specification, in which—

Figure 1:
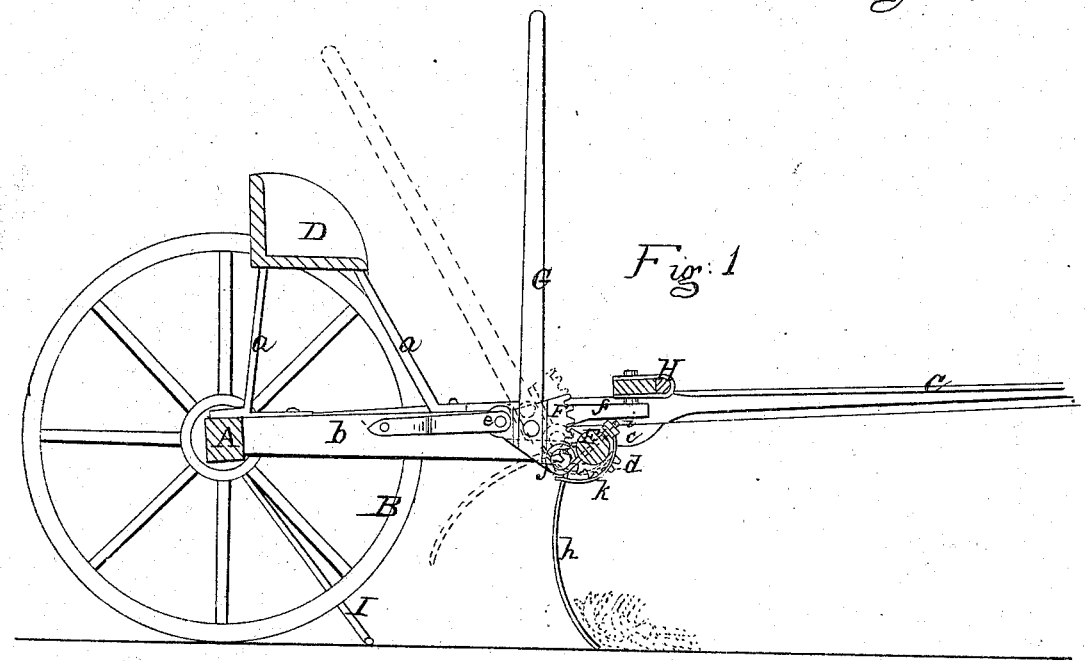
Figure 2:
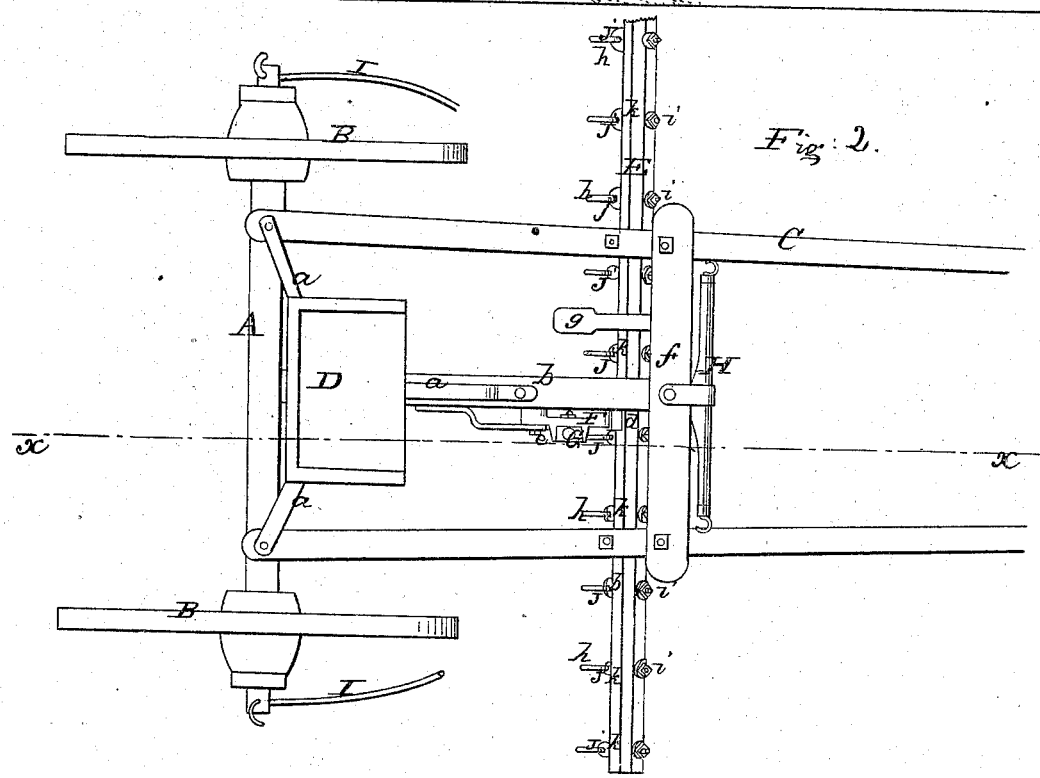

Figure 1 is a side sectional view of our invention, taken in the line $x\,x$, Fig. 2. Fig. 2 is a plan or top view of the same.

Similar letters of reference indicate corresponding parts in the two figures.

The nature of our invention consists in the arrangement of parts, as hereinafter specified.

To enable those skilled in the art to fully understand and construct our invention, we will proceed to describe it.

A represents an axle, having a wheel, B, at each end, and thills C attached to it.

D is the driver's seat, supported by rods $a$, attached to the axle A, and to a longitudinal bar, $b$, attached thereto.

E is a rake-head, which is fitted in proper bearings, $c$, attached to the under side of the thills. The rake-head is allowed to turn freely in its bearings, and a geared ring or band, $d$, is fitted thereon, at or about its center.

To the bar B, at one side, a toothed sector, F, is attached by a fulcrum-pin, $e$, and to the sector F a lever, G, is attached, which extends upward in front of the driver's seat D. The sector F gears into the ring or band $d$. The front end of the bar $b$ is attached to a cross-piece, $f$, of the thills, to which cross-piece the whiffletree H is secured, and to the rake-head E a foot-piece, $g$, is attached, the use of which will be presently shown.

The rake-teeth $h$ are attached to the head E in the usual way, the upper ends of the teeth passing through the head and having screw-nuts $i$ on them, a coil, $j$, being formed in each tooth or rod just below the head E. The teeth $h$ are constructed of wire or rods in the usual way.

To the rake-head E flat springs $k$ are attached by the same nuts $i$ that are screwed on the upper ends of the teeth $h$, the springs $k$ being fitted on the upper ends of teeth $h$. The lower ends of the springs $k$ are perforated, and the teeth $h$ pass through them. The springs $k$ serve as elastic stays or braces to the teeth $h$, and, while serving as supports or braces, still allow the teeth $h$ to have a requisite degree of elasticity.

To each end of the axle A, at the outer side of the hubs of the wheels B, a curved wire or rod, I, is attached. These rods extend down to the ground, or nearly to it, and their lower ends project forward, and are curved toward the wheels, as shown clearly in Fig. 2.

The operation is as follows: As the machine is drawn along the teeth $h$ collect the grass or grain as usual, and when the rake is full the driver on seat D draws back the lever G, and the sector F, in consequence of gearing into toothed ring $d$, will turn the head E, and the teeth $h$ will be raised backward, as shown in Fig. 1, and the grain or grass discharged there from. The teeth $h$ are lowered by throwing forward the lever G. The rods I throw aside a portion of the gavel discharged by the rake, so that the wheels may pass through the gavel without thrashing out the grain. The driver assists the movement of the rake, to a certain extent, by the operation of his foot on treadle $g$.

By placing the rake in front of the wheels the machine may be more readily managed and the rake operated by a more direct application of power than can be done in the ordinary machines.

Having thus described our invention, what we claim as new, and desire to secure by Letters Patent, is—

The arrangement and combination of the rake E, toothed sector F, toothed ring $d$, supplemental springs $k$, and clearers I, substantially as and for the purposes set forth.

L. H. PARSON.
GEORGE HOUSTON.

Witnesses:
JOHN M. TUTHILL,
H. A. COX.